April 11, 1950  F. A. KOESTER  2,503,495
COUPLING
Filed March 3, 1947
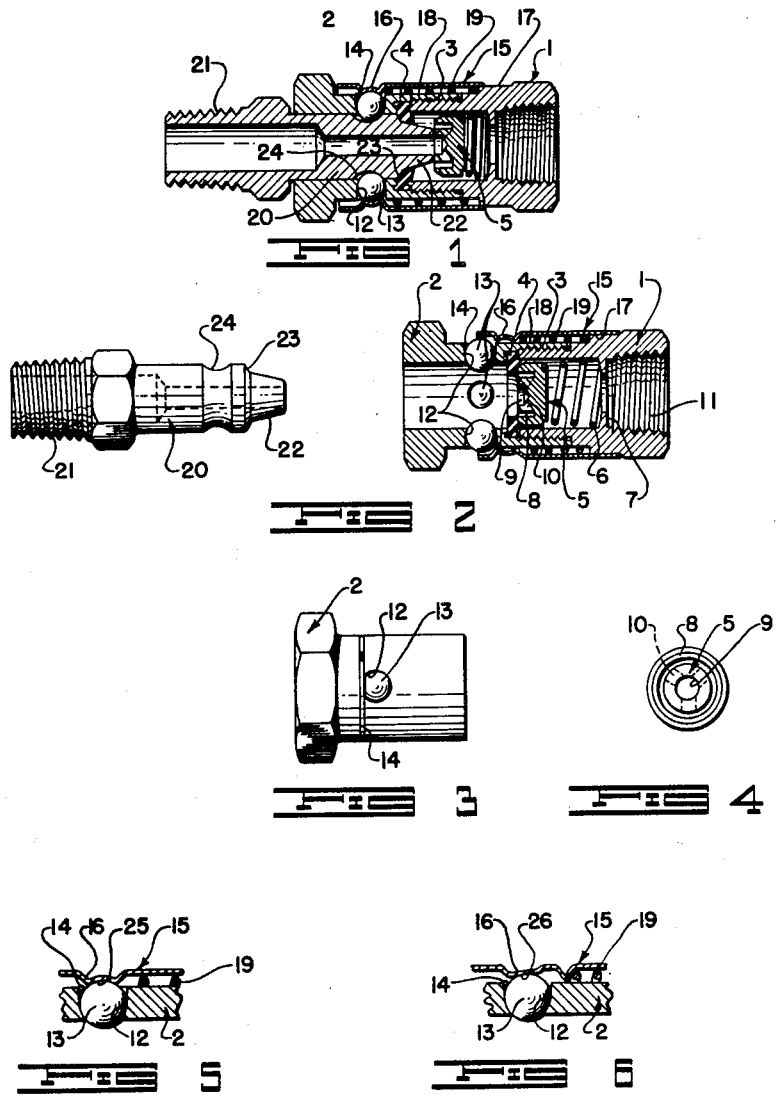
INVENTOR:
FREDRICK A. KOESTER
BY:
Lyon & Lyon
ATTORNEYS Patented Apr. 11, 1950

2,503,495

UNITED STATES PATENT OFFICE 2,503,495

COUPLING

Frederick A. Koester, Los Angeles, Calif.

Application March 3, 1947, Serial No. 731,977

5 Claims. (Cl. 284—19)

1

My invention relates to couplings for fluid lines. More particularly, to couplings wherein the part connected to the supply line is automatically sealed when the coupling is separated.

Included in the objects of my invention are:

First, to provide a coupling which may be readily and quickly coupled or uncoupled and which is so arranged that there need be no loss of fluid during the operation of connecting or unconnecting the coupling.

Second, to provide a coupling of this character which though capable of quick connection and disconnection when desired, is so arranged that even under adverse conditions of use will not accidentally become uncoupled.

Third, to provide a coupling of this character which may be readily disassembled or partly disassembled for replacement of the sealing washer without danger of losing the smaller parts such as the locking elements employed to unite the coupling.

With the above and other objects as may appear hereinafter, reference is directed to the accompanying drawings in which:

Figure 1 is a longitudinal sectional view through the coupling showing the parts joined together.

Figure 2 is a similar sectional view showing the parts separated, and with the pin element of the coupling shown in elevation.

Figure 3 is an elevational view of one of the coupling body members showing the means whereby the key balls are retained in their sockets.

Figure 4 is an elevational view of the valve disk which seals the supply line when the parts of the coupling are separated.

Figure 5 is an enlarged fragmentary detailed view of a key ball and its retainer sleeve.

Figure 6 is a similar sectional view showing a modified form of the retainer sleeve.

The coupling includes a pair of tubular body members 1 and 2, which are joined coaxially by a screw thread connection 3. The screw thread connection is employed to clamp the margins of a seal ring 4, which projects into the bore or passageway formed by the body members 1 and 2.

The bore of the body member 1 receives a valve disk 5, which is adapted to sealingly engage the ring 4. The valve disk 5 is backed by a spring 6, which bears against a constriction 7 formed within the body member 1. The outer face of the valve disk, that is, the face directed toward the seal ring 4, is provided with an annular channel 8 and a central recess 9, connected by radial

2 ports 10. The seal disk is adapted to be engaged by the mating portion of the coupling, to be described hereinafter.

The body member 1 is provided with suitable internal threads 11 for connection to a hose or other supply of pressure fluid.

The body member 2 is provided with radially directed keyholes 12, which receive key balls 13. The keyholes are constricted slightly at their inner extremities, which intersect the bore of the body member so as to limit radially inward movement of the key balls. Radially outward movement of the key balls is limited by a split retainer ring 14, which lies in a small groove intersecting tangentially the several keyholes 13.

The body members 1 and 2 slidably receive a sleeve 15 which is provided with an internal rib 16 adapted to be moved over the key balls 13 as shown in Figure 1 to hold the key balls in their radially inner position. The tubular body members define a bearing portion 17 of larger diameter on which the extremity of the sleeve 15 remote from the rib 16 rides, and a bearing portion 18 of lesser diameter on which the rib 16 rides. A spring 19 is interposed between the rib 16 and a shoulder formed at the juncture of the bearing portions 17 and 18.

The mating member of the coupling includes a stem 20 provided at one end with a fitting 21 which may be integral therewith and is adapted to be connected to a valve or any form of tool to which it is desired to supply fluid. The stem 20 is provided with a tapered end 22 which is adapted to engage the valve disk 5 and move the valve disk away from the seal ring 4. The stem is tubular and the bore of the stem communicates with the recess 9 so that a passageway is formed through the valve body 1, annular channel 8, ports 10 and recess 9 to the bore of the stem 20 as shown in Figure 1.

The stem 20 is provided with a shoulder 23 which sealingly engages the ring 4 so that when the coupling is connected the fluid cannot escape between the stem 20 and the tubular body member 2.

The stem 20 is provided with an annular channel 24 which is adapted to receive the key balls 13. During the process of connecting the coupling, the sleeve 15 is moved so that the rib 16 clears the key balls 13 permitting radial expansion of the key balls until the channel 24 is in registry therewith. Thereupon, the sleeve is returned to the position shown in Figure 1, locking the key balls in their inner position and preventing removal of the stem 20.

While the spring 19 is normally sufficient to maintain the sleeve in position, it is preferred to so shape the internal rib 16 that the fluid pressure applied against the stem 20 may be employed to supplement the action of the spring 19. As shown in Figures 1, 2, and 5, this is accomplished by giving the internal rib 16 a reverse curvature as indicated by 25. Or, as shown in Figure 6, the bearing face 26 of the internal rib 16 may slope slightly. In either case, the resultant force caused by the tendency of the stem 20 to move outwardly from the body members has the effect of retaining the sleeve in its locking position, shown in Figures 1, 5 and 6.

The retainer ring 14 serves a particularly useful function when it is necessary to disassemble the body members in order to replace the seal ring 14. It will be observed particularly in Figure 3 that the key balls are held in place by the ring 14 even though the sleeve 15 may be removed therefrom.

Many other embodiments of the invention may be resorted to without departing from the spirit of the invention.

I claim:

1. A coupling, comprising: a tubular body structure; an annular sealing washer forming a constriction therein; a valve element within said body structure engageable with said washer; a coupling unit adapted to enter said tubular body structure, engage said sealing washer and lift said valve element therefrom; said coupling unit having keeper groove; a plurality of radially movable key balls mounted in the walls of said tubular body structure for engagement with said keeper groove; and a sleeve slidable on said body structure and including an internal rib of essentially W section to provide a sloping camway and a rudimentary channel displaced inwardly from the normal surface of said sleeve, said rib being engageable with said key balls to hold said balls in said keeper groove.

2. A coupling, comprising: a tubular body structure; a valve means normally closing the bore of said body structure; a tubular coupling unit adapted to enter said bore, and open said valve means for communication through said coupling unit, said coupling having a keeper groove; a plurality of radially movable key balls mounted in the walls of said tubular body structure for engagement with said keeper groove; and a sleeve slidable on said body structure and including an annular constriction defining a sloping cam surface and a rudimentary channel engageable with said key balls to hold said balls in said keeper groove.

3. A coupling, comprising: a tubular body structure; a valve means normally closing the bore of said body structure; a tubular coupling unit adapted to enter said bore, and open said valve means for communication through said coupling unit, said coupling having a keeper groove; key balls mounted in the walls of said body structure for limited radial movement, said key balls adapted to enter the keeper groove of said coupling unit; a sleeve slidably mounted on said body structure and having an annular constriction defining a sloping cam surface and a rudimentary channel adapted to engage said key balls to hold them in said keeper groove; and a spring urging said sleeve to a position effecting engagement of said key balls by said internal rib.

4. A coupling, comprising: a tubular body structure; a valve means normally closing the bore of said body structure; a tubular coupling unit adapted to enter said bore, and open said valve means for communication through said coupling unit, said coupling having a keeper groove; key balls mounted in the walls of said body structure for limited radial movement, said key balls adapted to enter the keeper groove of said coupling unit; a sleeve slidably mounted on said body structure; a spring urging said sleeve to one extreme position; said sleeve having an internal rib urged by said spring to bear against said key balls to hold said key balls in said keeper groove, the engaging face of said rib being shaped to augment the force of said spring on said sleeve when subjected to radial loads exerted by said key balls.

5. A coupling, comprising: a tubular body structure; a valve means normally closing the bore of said body structure; a tubular coupling unit adapted to enter said bore, and open said valve means for communication through said coupling unit, said coupling having a keeper groove; said body structure having radial holes intersecting said bore and constricted at their inner ends; key balls fitting said holes, and engageable with the keeper groove of said coupling unit; said body having a rudimentary groove substantially tangential to said radial holes and a single convolution of wire spring set in said groove and overlying said holes sufficiently to resist removal of said key balls; a sleeve slidably mounted on said body structure and having an internal rib of essential W section to provide a sloping camway and a rudimentary channel displaced inwardly from the normal surface of said sleeve, said rib being adapted to engage said key balls to hold them in said keeper groove; and a spring urging said sleeve to a position effecting engagement of said key balls by said internal rib.

FREDERICK A. KOESTER.

REFERENCES CITED

The following references are of record in the file of this patent:

UNITED STATES PATENTS

| Number | Name | Date |
|---|---|---|
| 1,638,261 | Henricson | Aug. 9, 1927 |
| 1,706,460 | Norling | Mar. 26, 1929 |
| 1,858,276 | Miller | May 17, 1932 |
| 1,953,830 | Park | Apr. 3, 1934 |
| 2,044,252 | Mitchell | June 16, 1936 |
| 2,248,701 | Fowler | July 8, 1941 |
| 2,255,333 | Scheiwer | Sept. 9, 1941 |
| 2,279,146 | Schneller | Apr. 7, 1942 |
| 2,297,548 | Fox et al. | Sept. 29, 1942 |
| 2,322,877 | Parker | June 29, 1943 |
| 2,327,611 | Scheiwer | Aug. 24, 1943 |